United States Patent Office 3,808,122
Patented Apr. 30, 1974

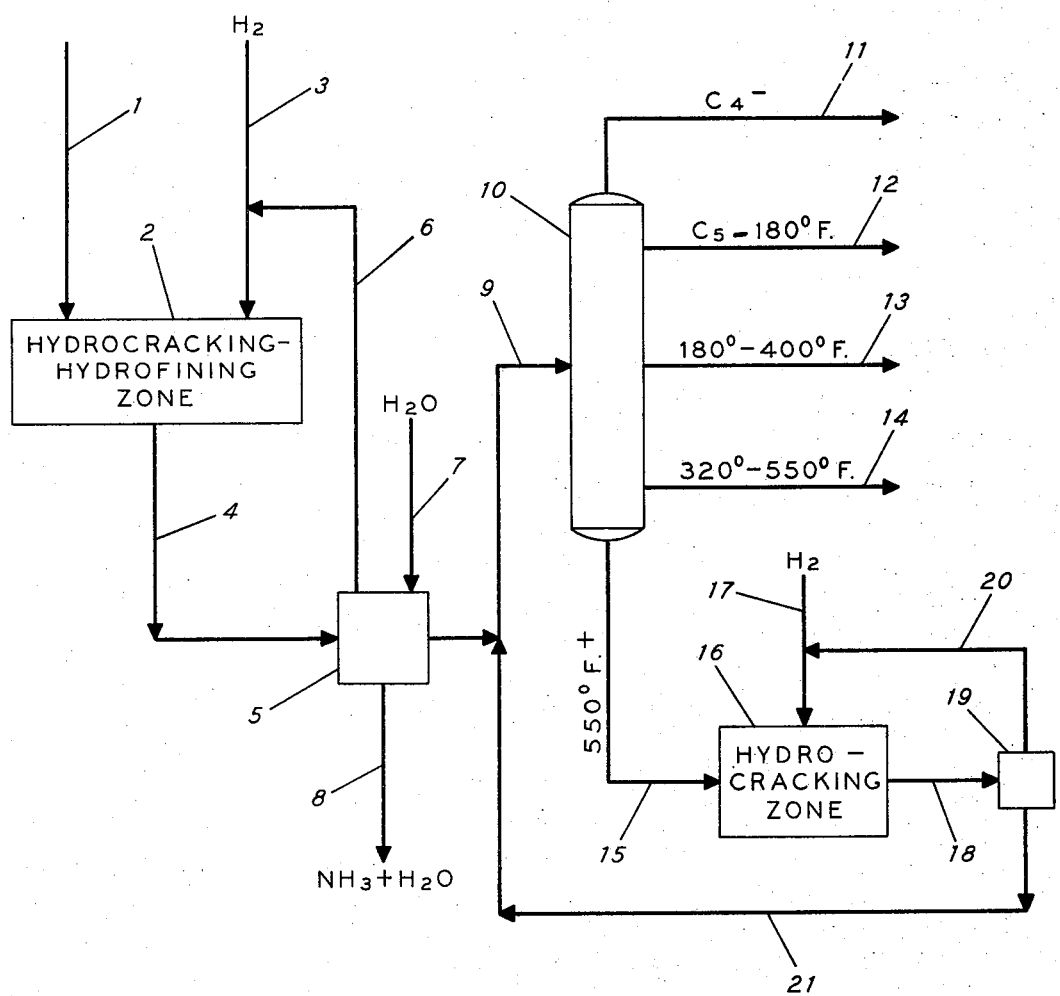

3,808,122
JET FUEL BY HYDROCRACKING
Robert J. White, Pinole, and Clark J. Egan, Piedmont, Calif., assignors to Chevron Research Company, San Francisco, Calif.
Filed Mar. 29, 1973, Ser. No. 346,231
Int. Cl. C10q *13/02, 37/02*
U.S. Cl. 208—59      11 Claims

ABSTRACT OF THE DISCLOSURE

A process is disclosed for producing jet fuel using a sequential hydrocracking process. The first zone contains a composite catalyst comprising:
(a) A gel matrix comprising an amorphous refractory oxide, nickel or cobalt, and molybdenum or tungsten;
(b) A crystalline zeolitic molecular sieve, substantially in the ammonium or hydrogen form and substantially free of any catalytic loading metal or metals.

The second zone contains a catalyst comprising an amorphous aluminosilicate component and a hydrogenating component comprising a Group VIII metal, wherein the catalyst has been subjected with the hydrogenating component in oxide form to a heat treatment in a substantially dry, nonreducing gas, at a temperature in the range 1200° to 1800° F.

The two-zone sequential hydrocracking process provides maximum jet fuel yield while minimizing production of other low-value materials. The first-zone catalyst also acts to hydrofine the feedstock, providing a cleaner feed for the second-zone catalyst.

BACKGROUND OF THE INVENTION

Field of the invention

Crude oil supplies in the United States are becoming more and more difficult to obtain. The "energy crisis" has been widely discussed. The necessity for obtaining the maximum amount of valuable products from each barrel of crude is obvious.

The purpose of the present invention is to maximize jet fuel yield in the most economic manner to help meet the ever-increasing demands for jet fuel. By the two-zone hydrocracking process of the present invention the yield of jet fuel can be maximized while minimizing the production of other less-valued products of hydrocracking.

Description of the prior art

Catalysts of the type used in the first hydrocracking zone of the present invention are described in U.S. Pats. 3,558,475 and 3,598,719. These patents discuss the desirable properties of these catalysts and indicate that excellent-quality jet fuel in high yields can be obtained using these catalysts.

U.S. Pats. 3,132,087 and 3,140,253 are directed to zeolite-containing catalysts useful in hydrocracking processes.

U.S. Pats. 3,453,204 and 3,243,368 disclose hydrocracking catalysts wherein the catalysts have been subjected to thermactivation treatment at a temperature in the range from 1200° to 1600° F. in the case of U.S. 3,453,204, and 1200° to 1800° F. in the case of U.S. 3,243,368.

SUMMARY OF THE INVENTION

The present invention is directed to a process for producing jet fuel from a hydrocarbon feedstock which comprises:

(1) contacting the feedstock in a first hydrocracking zone at hydrocracking conditions with hydrogen and a first hydrocracking catalyst comprising:
    (A) a gel matrix comprising:
        (a) silica in an amount of 0 to 85 weight percent;
        (b) alumina, in an amount providing a silica/alumina weight ratio of 85/9 to 0/100, with a maximum content of alumina in the matrix of 94 weight percent and a minimum of 9 weight percent;
        (c) nickel or cobalt, or the combination thereof, in the form of metal, oxide, sulfide or any combination thereof, in an amount of 1 to 10 weight percent of said matrix, calculated as metal;
        (d) molybdenum or tungsten, or the combination thereof, in the form of metal, oxide, sulfide or any combination thereof, in an amount of 5 to 25 weight percent of said matrix, calculated as metal; and
    (B) a crystalline zeolitic molecular sieve substantially in the ammonium or hydrogen form, substantially free of any catalytic loading metal or metals, said sieve further being in particulate form and being dispersed through said matrix,
        said catalyst being further characterized by an average pore diameter below 100 A. and a surface area above 200 square meters per gram,
        thereby obtaining a first-hydrocracking-zone effluent;

(2) contacting at least a portion of the effluent from the first hydrocracking zone boiling above 500° F. in a second hydrocracking zone at hydrocracking conditions with a second hydrocracking catalyst comprising an amorphous silica-alumina component and a hydrogenating component comprising a Group VIII metal, said catalyst having been subjected with said hydrogenating component in the oxide form to a heat treatment in a substantially dry non-reducing gas at a temperature in the range 1200° to 1800° F., thereby obtaining a second hydrocracking zone effluent comprising a jet fuel boiling in the range 300° to 550° F.; and (3) recovering the jet fuel from the effluent of the
(3) recovering the jet fuel from the effluent of the second hydrocracking zone.

The jet fuel cut of the effluent from the first hydrocracking zone may be separated and recovered as a product before the heavier portion of the first-hydrocracking-zone effluent is sent to the second hydrocracking zone. Other lighter materials such as gasoline and light gases may also be separated.

A preferred catalyst for the first hydrocracking zone comprises a cogelled catalyst comprised of nickel oxide, tungsten oxide, titania, alumina and silica and containing crystalline zeolitic molecular sieve (Y) in the hydrogen form. A preferred catalyst for the second hydrocracking zone comprises 0.5 weight percent palladium, silica and alumina, wherein the alumina/silica weight ratio is 60/40.

BRIEF DESCRIPTION OF THE DRAWING

The drawing is a diagrammatic illustration of the apparatus and flow paths suitable for carrying out one embodiment of the process of the present invention.

DETAILED DESCRIPTION OF THE INVENTION

The subject invention is directed to a hydrocracking process wherein:

(1) a hydrocarbon feedstock containing a substantial amount of materials boiling above 500° F. is contacted in a first hydrocracking zone at hydrocracking conditions with hydrogen and a hydrocracking catalyst comprised of a gel matrix and a crystalline zeolitic sieve;

(2) at least a portion of the effluent from the first hydrocracking zone boiling above 500° F., preferably 550° F., is contacted in a second hydrocracking zone at hydrocracking conditions with a second hydrocracking catalyst comprising an amorphous alumina-silica component and a hydrogenating component comprising a Group VIII metal, wherein the catalyst has been subjected with the hydrogenating component in the oxide form to a heat treatment in a substantially dry nonreducing gas at a temperature in the range 1200° to 1800° F.; and (3) recovering from the effluent of the second hydrocracking zone a high-quality jet fuel.

HYDROCARBON FEEDSTOCKS

The feedstocks supplied to the first hydrocracking zone in the process of the present invention may be selected from the group consisting of petroleum distillates, solvent-deasphalted petroleum residua, shale oils and coal tar distillates. The feedstocks contain substantial amounts of materials boiling above 400° F., preferably substantial amounts of materials boiling in the range 500° to 950° F., and more preferably in the range 500° to 900° F. Materials boiling at lower temperatures may also be present, but at least 30 and preferably 50 volume percent of the feedstock will boil above 500° F. Suitable feedstocks include those heavy distillates normally defined as heavy straight-run gas oils and heavy cracked cycle oils as well as conventional FCC feed and portions thereof. Cracked stocks may be obtained from thermal or catalytic cracking of various stocks, including those obtained from petroleum, gilsonite, shale and coal tar. Because of the superior hydrofining activity and stability of the catalyst in the first zone of the present invention, the feedstocks need not be subjected to a prior hydrofining treatment before being used in the first-zone hydrocracking process of the present invention. Feedstocks may contain as high as several thousand parts per million organic nitrogen, although preferably the organic nitrogen content will be less than 1000 p.p.m. organic nitrogen. Feedstocks also may contain several weight percent organic sulfur. The effluent from the first hydrocracking zone preferably contains less than 50 p.p.m. nitrogen and less than 0.1 weight percent sulfur.

CATALYST USED IN THE FIRST HYDROCRACKING ZONE

The catalyst used in the first hydrocracking zone of the present invention is of the general type described above under "summary of the invention."

The crystalline zeolitic molecular sieve component of the hydrocracking catalyst may be of any type that is known in the art as a useful component of a conventional hydrocracking catalyst containing a crystalline zeolitic molecular sieve component. A decationized molecular sieve cracking component is preferred. Especially suitable are faujasite, particularly (Y) and (X) type faujasite, and mordenite, in the ammonium or hydrogen form.

METHOD OF PREPARATION

The molecular sieve component of the catalyst may be prepared by any conventional method known in the art.

The molecular sieve component may be dispersed in a matrix of the other catalyst components by cogelation of said other components around said molecular sieve component in a conventional manner.

The molecular sieve component, substantially in the ammonium or hydrogen form, may be maintained substantially free of any catalytic loading metal or metals by dispersing the molecular sieve component in a slurry of the precursors of the other catalyst component at a pH of 5 or above. When a sodium form of molecular sieve component is one of the starting materials, it may be converted to the ammonium or hydrogen form by ion exchange prior to being combined with the other catalyst components. Alternatively, it may be combined with the other catalyst components and then converted to the ammonium or hydrogen form by ion exchange. In either case, the molecular sieve component should not be combined with the precursors of the other catalyst components at a pH below 5.

The finished catalyst may be sulfided in a conventional manner prior to use, if desired. If not presulfided, the catalyst will tend to become sulfided during process operation from any sulfur content that may be present in the hydrocarbon feed.

The matrix described above may further comprise titanium, zirconium, thorium or hafnium, or any combination thereof, in the form of metal oxide, sulfide, or any combination thereof, in an amount of 1 to 10 weight percent, preferably 5 to 9 weight percent, of said matrix, calculated as metal. Such additional Group IV component or components will impart improved characteristics, notably stability, to the catalyst.

Preferably said gel matrix comprises nickel and tungsten, in the form of the metals oxides, sulfides, or any combination thereof. When a Group IV component is present, preferably it is titanium, in the metal, oxide or sulfide form, with titania being especially preferred. Said molecular sieve may be present in an amount of 1 to 70 weight percent of said composite.

Still further in accordance with the process of the present invention, there is provided a first-hydrocracking-zone catalyst comprising:

(A) a porous xerogel comprising:
  (a) silica, in an amount of 0 to 85 weight percent;
  (b) alumina, in an amount providing a silica-to-alumina weight ratio of 85/9 to 0/100, with a maximum amount of alumina in the xerogel of 94 weight percent;
  (c) nickel, in the form of metal, oxide, sulfide or any combination thereof, in an amount of 1 to 10 weight percent, preferably 5 to 9 weight percent, of said xerogel, calculated as metal;
  (d) tungsten, in the form of metal, oxide, sulfide or any combination thereof, in an amount of 5 to 25 weight percent, preferably 10 to 20 weight percent, of said xerogel, calculated as metal,
(B) a crystalline zeolitic molecular sieve, in an amount of 1 to 70 weight percent of said catalyst, said sieve being substantially in the ammonium or hydrogen form, and being substantially free of any catalytic loading metal or metals, said sieve further being in the form of particles, said particles being dispersed through said xerogel;
  said catalyst having an average pore diameter below 100 A. and a surface area above 200 square meters per gram.

Said porous xerogel may further comprise titanium, zirconium, thorium or hafnium or any combination thereof, in the forms and amounts previously discussed.

Still further in accordance with the process of the present invention, there is provided a first-hydrocracking-zone catalyst comprising a silica-alumina matrix having dispersed in it particles of a low-sodium molecular sieve zeolite, the silica-alumina matrix having dispersed in it a Group VI metal or metal compound and a Group VIII metal or metal compound and the zeolite being substantially free of chemically or physically bonded metals or metal compounds having appreciable catalytic activity for hydrogenation.

Still further in accordance with the process of the present invention, there is provided a first-hydrocracking-zone catalyst comprising a crystalline zeolitic molecular sieve in the ammonium or hydrogen form, substantially free of metals or metal compounds having catalytic activity for hydrogenation, dispersed in a hydrocracking catalyst matrix comprising (1) silica-alumina having dispersed in it (2) 1 to 10% by weight of nickel or cobalt in the form of metal, metal oxide or metal sulfide (calculated as metal) and (3) 5 to 25% by weight of molybdenum or tungsten in the form of metal, metal oxide or metal sulfide (calculated as metal).

The reference to a crystalline zeolitic molecular sieve "substantially free of any catalytic loading metal or metals" means that the molecular sieve contains no more than 0.5 total weight percent of catalytic metal or metals, calculated as the metal and based on the sieve, of which no more than 0.1 weight percent may be a noble metal or metals. The catalytic metal or metals include the Group VI and VIII metals.

It will be noted that the weight ratio of catalytic metal in the non-molecular sieve portion of the catalyst to catalytic metal in the molecular sieve portion of the catalyst is high. Certain prior art catalysts achieve a low catalytic metal loading of the molecular sieve component only with a concurrent very low metal content of the non-molecular sieve portion of the catalyst, and it has been found that such catalysts are inferior to the catalysts used in the first zone of the process of the present invention.

CATALYST USED IN THE SECOND HYDROCRACKING ZONE

The catalyst used in the second hydrocracking zone is comprised of a Group VIII hydrogenating component, preferably a component comprising a noble metal, said component being in the metal, oxide or sulfide form, and an amorphous alumina-silica component, said alumina-silica component having an alumina content of 40 to 95 weight percent, preferably 50 to 80 weight percent. That is, the alumina/silica weight ratio is 40/60 to 95/5, preferably 50/50 to 80/20. The alumina-silica component can be prepared by conventional methods, for example cogelation. The catalyst has an activity as induced therein by having been subjected, with the hydrogenating component in the oxide form, to a heat treatment in a substantially dry non-reducing gas, for example air, at a temperature in the range of 1200° to 1800° F. The non-reducing gas will be considered substantially dry if it contains less than 1 weight percent water. Preferably it will contain less than 0.1 weight percent water, and more preferably less than 0.01 weight percent water.

The Group VIII hydrogenating component not only preferably comprises a Group VIII noble metal, that is, a metal selected from the metals of the palladium and platinum series (having atomic numbers of 44–46 and 76–78, respectively), but more preferably comprises platinum or palladium, or both. As between platinum and palladium, palladium is peferred.

It is desirable that the catalyst used in the second stage of the process of the present invention have a surface area of at least 100 square meters per gram and a bulk density such that the product of the numerical values of the surface area and bulk density is in the range of 100 to 450, preferably 200 to 300 square meters/milliliter.

The catalyst used in the second stage of the hydrocracking zone of the present invention contains at least one Group VIII hydrogenating component, preferably a hydrogenating component comprising a metal selected from ruthenium, rhodium, palladium, osmium, iridium and platinum. It is highly preferred that the hydrogenating component comprise palladium or platinum, or both. The hydrogenating component will be present in the catalyst in an amount of 0.02 to 10 weight percent, preferably 0.1 to 1 weight percent, and more preferably 0.1 to 0.5 weight percent, calculated as metal.

During the hydrocracking process use the hydrogenating component will tend to become reduced under the conditions prevailing in the hydrocracking reaction zone.

When a Group VIII hydrogenating component other than a noble metal is used, it is preferred that the metal it comprises be nickel.

The alumina-silica component after formation by any conventional method may be dried and subjected to a heat treatment, for example at 800° F., prior to impregnation of the alumina-silica component with a precursor of the hydrogenating component. The hydrogenating component may also be added to the alumina-silica component before drying, particularly when a cogelation process is used to form the alumina-silica component.

Following preparation of the alumina-silica component, that component may be impregnated with any suitable precursor of the hydrogenating component, and the resulting composite may be dried, all in a conventional manner. Prior to use in the second hydrocracking zone, the catalyst composite so prepared is subjected to a heat treatment in the range 1200° to 1800° F., preferably 1450° to 1700° F., for a period of time which may range from 0.25 to 48 hours, preferably 0.5 to 10 hours, and more preferably 1 to 5 hours. Particularly good results have been obtained with heat treatments of 1 to 4 hours at 1400° F. The necessary oxide form of the hydrogenating component may be attained during the heat treatment, as a result of the presence of oxygen in the non-reducing gas, or may be the result of a previous heat treatment step, such as calcination in air, at a temperature of at least 450° F.

The heat treatment in the substantially dry non-reducing gas is preferably carried out in a stream of substantially dry air at the indicated temperature.

OPERATING CONDITIONS

The operating conditions in both the first hydrocracking zone and the second hydrocracking zone are those used conventionally in hydrocracking operations. These include a temperature in the range 400° to 950° F., preferably 500° to 850° F., a pressure in the range 500 to 10,000 p.s.i.g., preferably 800 to 5000 p.s.i.g., and more preferably 1000 to 3000 p.s.i.g. A space velocity in the range 0.1 to 5, preferably 0.5 to 3.0, together with a total hydrogen supply rate (makeup and recycle hydrogen) to the zones from 500 to 20,000 s.c.f., preferably 1000 to 5000 s.c.f. of hydrogen per barrel of hydrocarbon feedstock.

PROCESS OPERATION WITH REFERENCE TO THE DRAWING

Referring now to the drawing, in accordance with one embodiment of the present invention a hydrocarbon feedstock as previously described and boiling above 550° F., and which may contain a substantial amount of organic nitrogen, is passed through line 1 into hydrocracking zone 2, which contains a catalyst of the present invention as described above under the heading "catalyst used in the first hydrocracking zone." The feedstock is hydrocracked in hydrocracking zone 2 at conditions previously described, in the presence of hydrogen supplied through line 3. Under these conditions concurrent hydrodenitrification takes place to the extent that the feedstock is substantially denitrified, i.e., hydrofining also occurs. The effluent from zone 2 is passed through line 4 to separation zone 5, from which hydrogen separated from the treated feedstock is recycled through line 6 to zone 2. In zone 5, water entering through line 7 is used to scrub ammonia and other contaminants from the incoming hydrocarbon stream, and the ammonia, water and other contaminants are withdrawn from zone 5 through line 8. From zone 5 the scrubbed, hydrocracked materials are passed through line 9 to distillation column 10, where they are separated into fractions, including a $C_4$-fraction which is withdrawn through line 11, a $C_5$-180° F. fraction which is withdrawn through line 12, a 180–400° F. fraction which is withdrawn through line 13, a 320–550° F. fraction which is withdrawn through line 14, and a 550° F.+fraction which is withdrawn through line 15 and sent to second hydrocracking zone 16, where it is catalytically hydrocracked in the presence of the hydrocracking catalyst described above under the heading "catalyst used in the second hydrocracking zone" in the presence of hydrogen supplied to zone 16 through line 17. The effluent from zone 16 is sent via line 18 to separation zone 19, where hydrogen is separated from the hydrocarbon effluent and returned to hydrocracking zone 16 via line 20. From separator 19 hydrocracked materials are passed through lines 21 and 9 to distillation column 10.

The products obtained from distillation column 10 include a $C_5$-180° F. fraction which can be used as a high-volatility component for gasolines, 180–400° F. fraction which may be used as a reforming feedstock, and the 320–550° F. fraction withdrawn through line 14, which is a superior-quality jet fuel.

It is preferred that the first hydrocracking zone be operated at low conversion levels. The catalyst described above under "catalyst used in the first hydrocracking zone" has a high selectivity for jet fuel production at low conversion levels. Further, the light gasoline cut, e.g., $C_5$-180° F., does not have as high an octane numbr as is desirable for unleaded gasolines. Consequently, by operating at low conversion levels in the first hydrocracking zone, jet fuel yield is maximized while limited the production of the less-desirable light gasoline. A conversion level of about 20 to 40%, preferably about 30% on a volume basis to materials boiling below 500° F., is preferred in the first hydrocracking zone. The first hydrocracking zone catalyst has good denitrification activity and hence provides a clean feedstock for the second hydrocracking zone catalyst. Also little or no hydrocarbon recycle to the first zone is required. The second hydrocracking zone can also be operated at a low conversion level of from 20 to 40% if desired while maintaining a high level of jet fuel production.

EXAMPLE (A) A cogelled catalyst (catalyst A) of the following composition is prepared.

| Component: | Wt. percent of total catalyst |
|---|---|
| NiO | 9.2 |
| $WO_3$ | 22.7 |
| $TiO_2$ | 7.2 |
| $Al_2O_3$ | 27.0 |
| $SiO_2$ | 23.9 |
| Crystalline zeolitic molecular sieve, (Y) form | 10.0 |
| Total | 100.0 |

The catalyst is prepared by the following steps, using sufficient quantities of the various starting materials to produce the above-indicated weight percentages of the components of the final catalyst:

(1) An aqueous acidic solution is prepared, containing $AlCl_3$, $TiCl_4$, $NiCl_2$ and acetic acid;

(2) Three alkaline solutions are prepared: (a) a sodium silicate solution; (b) a sodium tungstate solution; and (c) an aqueous ammonia solution containing sufficient ammonia so that upon combining the alkaline solutions with the acidic solution coprecipitation of all of the metal-containing components of the solutions occurs at a neutral pH of about 7;

(3) The acidic and alkaline solutions are combined, and coprecipitation of all of the metal-containing components of the solutions occurs at a pH of about 7, resulting in a slurry;

(4) Linde sodium (Y) crystalline zeolitic molecular sieve in finely divided form is added to the slurry;

(5) The molecular sieve-containing slurry is filtered to produce a molecular sieve-containing hydrogel filter cake, which is washed repeatedly with dilute ammonium acetate solution, to remove sodium and chloride ionic impurities from both the hydrogel and the molecular sieve contained therein; and (6) The molecular sieve-containing hydrogel is dried in an air-circulating oven and then is activated in flowing air for 5 hours at 950° F.

The finished catalyst is characterized by a surface area of 384 m.$^2$/g., a pore volume of 0.4 cc./g. an average pore diameter of 42 A., and a molecular sieve component substantially free of catalytic metals; that is, substantially all of the nickel, tungsten and titanium contained in the catalyst are located in the gel portion of the catalyst rather than in the molecular sieve component thereof.

(B) A catalyst (catalyst B) of the following composition is prepared.

| Component: | Wt. percent of total catalyst |
|---|---|
| Silica | 40.5 |
| Alumina | 59 |
| Palladium | 0.5 |
| Total | 100.0 |

The catalyst is prepared by the following steps, using sufficient quantities of the various starting materials to produce the above-indicated weight percentages of the components in the final catalyst:

(1) An aqueous acidic solution is prepared containing $AlCl_3$ and acetic acid;

(2) Two alkaline solutions are prepared: (a) a sodium silicate solution; and (b) an aqueous $NH_4OH$ solution containing sufficient ammonia so that upon combining the alkaline solutions with the acidic solution coprecipitation of all of the metal-containing components of the solutions occurs at a neutral pH of about 7;

(3) The acidic solution and the alkaline sodium silicate solution are combined followed by the addition of sufficient aqueous $NH_4OH$ solution to provide a mixture with a pH of 7. Coprecipitation of all the metal-containing components of the solutions occurs at a pH of about 7, resulting in a suspension;

(4) The mixture is then heated to 150° F. and the pH is readjusted to 7, and the mixture filtered;

(5) The filter cake is washed four times with a 1% ammonium-acetate-in-water solution at 150° F. and once in water at 150° F.;

(6) The cake is dried overnight at 250° F.;

(7) A solution of palladium tetraaminnodinitrate in water is added to the dried alumina-silica;

(8) The mixture is mixed until evenly wetted and then dried overnight at 250° F.; and (9) The catalyst is calcined in dry air at 1600° F. for 4 hours.

The catalyst has a surface area about 100 m.$^2$/g. and a bulk density such that the numerical product of the surface area and the bulk density is above 200 and below 300.

(C) Catalyst A is used in a first hydrocracking zone to hydrocrack a California gas oil feedstock, on a once-through basis. The gas oil feedstock has the following characteristics:

| | |
|---|---|
| Boiling range, °F. | 500–900 |
| Gravity, °API | 20 |
| Organic nitrogen content, p.p.m. | 3000 |

The hydrocracking conditions are:

| | |
|---|---|
| Total pressure, p.s.i.g. | 2500 |
| Total hydrogen rate, s.c.f./bbl. | 4000 |
| Liquid hourly space velocity, v./v./hr. | 2.0 |
| Per-pass conversion to products boiling below 550° F., vol. percent | 30 |

The portion of the effluent from the first hydrocracking zone boiling above 550° F. is hydrocracked in a second hydrocracking zone over catalyst B at the following conditions:

| | |
|---|---|
| Total pressure, p.s.i.g. | 2500 |
| Total hydrogen rate, s.c.f./bbl. | 4000 |
| Liquid hourly space velocity, v./v./hr. | 2.0 |
| Per-pass conversion to products boiling below 550° F., vol. percent | 30 |

From the 550° F. — portion of the effluent from the first hydrocracking zone a jet fuel boiling in the range 300–550° F., with a smoke point of greater than 20 mm. and a freze point below —90° F. is obtained.

Similarly, the effluent from the second hydrocracking zone yields a jet fuel boiling in the range 300–550° F., having a smoke point greater than 20 mm. and a freeze point below —90° F.

It is apparent that many widely different embodiments of the invention may be made without departing from the scope and spirit thereof; and, therefore, it is not intended to be limited except as indicated in the appended claims.

What is claimed is:

1. A process for producing jet fuel from a hydrocarbon feedstock containing a substantial amount of material boiling above 500° F., which comprises:
    (1) contacting said feedstock in a first hydrocracking zone at hydrocracking conditions with hydrogen and a first hydrocracking catalyst comprising:
        (A) a matrix comprising:
            (a) silica, in an amount of 0 to 85 weight percent;
            (b) alumina, in an amount providing a silica-to-alumina weight ratio of 85/9 to 0/100;
            (c) nickel or cobalt; or the combination thereof, in the form of metal, oxide, sulfide or any combination thereof, in an amount of 1 to 10 weight percent of said matrix, calculated as metal;
            (d) molybdenum or tungsten, or the combination thereof, in the form of metal, oxide, sulfide or any combination thereof, in an amount of 5 to 25 weight percent of said matrix, calculated as metal;
        (B) a crystalline zeolitic molecular sieve substantially in the ammonium or hydrogen form, substantially free of any catalytic loading metal or metals, said sieve further being in particulate form and being dispersed through said matrix, said catalyst being further characterized by an average pore diameter below 100 A. and a surface area above 200 square meters per gram,
        thereby obtaining a first-hydrocracking-zone effluent;
    (2) contacting at least a portion of said first-hydrocracking-zone effluent boiling above 500° F. in a second hydrocracking zone at hydrocracking conditions with a second hydrocracking catalyst comprising an amorphous alumina-silica component and a hydrogenating component comprising a Group VIII metal in an amount of 0.1 to 10 weight percent, calculated as metal, said catalyst having an activity as induced therein by having been subjected with the said hydrogenating component in the oxide form to a heat treatment in a substantially dry non-reducing gas at a temperature in the range 1200° to 1800° F., thereby obtaining a second hydrocracking zone effluent comprising a jet fuel boiling in the range 300° to 550° F.; and
    (3) recovering said jet fuel.

2. The process of claim 1 wherein the conversion is 20 to 40% by volume in said first hydrocracking zone and a jet fuel boiling in the range 300° to 550° F. is recovered from said first-hydrocracking-zone effluent.

3. The process of claim 1 wherein said matrix is a gel matrix.

4. The process of claim 3 wherein a jet fuel fraction boiling in the range 300° to 550° F. is recovered from said first hydrocracking zone effluent.

5. The process of claim 4 wherein said first hydrocracking catalyst comprises:
    (A) a gel matrix comprising:
        (a) at least 15 weight percent silica,
        (b) alumina, in an amount providing an alumina-to-silica weight ratio of 15/85 to 80/20,
        (c) nickel or cobalt, or the combination thereof, in the form of metal, oxide, sulfide or any combination thereof, in an amount of 1 to 10 weight percent of said matrix, calculated as metal,
        (d) molybdenum or tungsten, or the combination thereof in the form of metal, oxide, sulfide or any combination thereof, in an amount of 5 to 25 weight percent of said matrix, calculated as metal;
    (B) a crystalline zeolitic molecular sieve substantially in the ammonium or hydrogen form, substantially free of any catalytic loading metal or metals, said sieve further being in particulate form and being dispersed through said matrix,
    and said second hydrocracking catalyst comprises a hydrogenating component comprising palladium in an amount of 0.1 to 1.0 weight percent, calculated as metal, and an amorphous alumina-silica component having an alumina content of 40 to 95 weight percent.

6. The process of claim 5 wherein the conversion is 20 to 40% by volume in said first hydrocracking zone.

7. The process of claim 6 wherein the operating conditions in said first hydrocracking zone include a temperature in the range 400° to 950° F., a pressure in the range 500 to 10,000 p.s.i.g., a liquid hourly space velocity in the range 0.1 to 5, and a hydrogen supply rate from 500 to 20,000 s.c.f. of hydrogen per barrel of feed; and the operating conditions in said second hydrocracking zone include a temperature in the range 400° to 950° F., a pressure in the range 500 to 10,000 p.s.i.g., a liquid hourly space velocity in the range 0.1 to 5, and a hydrogen supply rate from 500 to 20,000 s.c.f. of hydrogen per barrel of feed.

8. The process of claim 1 wherein said first hydrocracking catalyst comprises:
    (A) a gel matrix comprising:
        (a) at least 15 weight percent silica,
        (b) alumina, in an amount providing an alumina-to-silica weight ratio of 15/85 to 80/20,
        (c) nickel or cobalt, or the combination thereof, in the form of metal, oxide, sulfide or any combination thereof, in an amount of 1 to 10 weight percent of said matrix, calculated as metal,
        (d) molybdenum or tungsten, or the combination thereof, in the form of metal, oxide, sulfide or any combination thereof, in an amount of 5 to 25 weight percent of said matrix, calculated as metal;

(B) a crystalline zeolitic molecular sieve substantially in the ammonium or hydrogen form, substantially free of any catalytic loading metal or metals, said sieve further being in particulate form and being dispersed through said matrix.

9. The process of claim 1 wherein said matrix comprises a porous xerogel comprising:
   (a) at least 15 weight percent silica,
   (b) alumina, in an amount providing an alumina-to-silica weight ratio of 15/85 to 80/20,
   (c) nickel, in the form of metal, oxide, sulfide or any combination thereof, in an amount of 1 to 10 weight percent of said xerogel, calculated as metal,
   (d) tungsten, in the form of metal, oxide, sulfide or any combination thereof, in an amount of 5 to 25 weight percent of said xerogel, calculated as metal; and said crystalline zeolitic molecular sieve is present in an amount of 1 to 70 weight percent of said catalyst.

10. The process of claim 1 wherein said matrix further comprises a Group IV component.

11. The process of claim 10 wherein said Group IV component is titania.

References Cited

UNITED STATES PATENTS

| | | | |
|---|---|---|---|
| 3,132,087 | 5/1964 | Kelley et al. | 208—60 |
| 3,243,368 | 3/1966 | Mulaskey et al. | 208—111 |
| 3,509,040 | 4/1970 | McKinney et al. | 208—59 |
| 3,554,898 | 1/1971 | Wood et al. | 208—59 |
| 3,558,475 | 1/1971 | Jaffe | 208—111 |
| 3,562,144 | 2/1971 | Child et al. | 208—59 |
| 3,598,719 | 8/1971 | White | 208—59 |

DELBERT E. GANTZ, Primary Examiner

G. E. SCHMITKONS, Assistant Examiner

U.S. Cl. X.R.

208—102